United States Patent
Gao et al.

(10) Patent No.: US 12,464,391 B2
(45) Date of Patent: Nov. 4, 2025

(54) SYSTEM AND METHOD FOR MONITORING A SENSOR NETWORK

(71) Applicant: Building Robotics, Inc., Santa Clara, CA (US)

(72) Inventors: Jun Gao, Saratoga, CA (US); Mustafa Mohamad, Kitchener (CA); Mohammadali Khazen, Toronto (CA)

(73) Assignee: Building Robotics, Inc., Santa Clara, CA (US)

( * ) Notice: Subject to any disclaimer, the term of this patent is extended or adjusted under 35 U.S.C. 154(b) by 308 days.

(21) Appl. No.: 18/458,411

(22) Filed: Aug. 30, 2023

(65) Prior Publication Data

US 2025/0081008 A1   Mar. 6, 2025

(51) Int. Cl.
*H04W 24/08* (2009.01)
*H04W 24/02* (2009.01)

(52) U.S. Cl.
CPC ........... *H04W 24/08* (2013.01); *H04W 24/02* (2013.01)

(58) Field of Classification Search
CPC .............................. H04W 24/02; H04W 24/08
See application file for complete search history.

(56) References Cited

U.S. PATENT DOCUMENTS

| | | | |
|---|---|---|---|
| 10,217,346 B1 | 2/2019 | Zhang et al. | |
| 10,349,216 B1 | 7/2019 | Tran et al. | |
| 10,422,854 B1 | 9/2019 | Huberman et al. | |
| 10,705,179 B2 | 7/2020 | Chen et al. | |
| 10,716,089 B1 | 7/2020 | Huberman et al. | |
| 11,032,665 B1 | 6/2021 | George et al. | |
| 11,062,606 B2 | 7/2021 | Beauchamp | |
| 11,096,008 B1 | 8/2021 | Batten | |

(Continued)

FOREIGN PATENT DOCUMENTS

| | | | |
|---|---|---|---|
| AU | 2021102531 A4 | 7/2021 | |
| AU | 2021105951 A4 | 10/2021 | |

(Continued)

OTHER PUBLICATIONS

Knox et al., "Wireless Fingerprints Inside a Wireless Sensor Network," Feb. 2015, ACM Transactions or Sensor Networks, vol. 11, No. 2, Article 37, pp. 1-30. (Year: 2015).*

(Continued)

*Primary Examiner* — Eron J Sorrell (57) ABSTRACT

Systems and methods for monitoring a sensor network are described. The system includes multiple sensors and an upstream device, and the sensors are paired in turn as transmitting and receiving sensors. The sensors collecting signal strength data for each sensor pair corresponding to beacons transmitted and received by the sensors. The upstream device generates an aggregate fingerprint based on the signal strength data, generates a zone fingerprint for each zone based on the aggregate fingerprint, and determines a wireless communication performance of the sensor network based on the zone fingerprints. The aggregate fingerprint includes a signal strength value for each sensor pair. Each zone fingerprint includes the signal strength value for each sensor pair of the corresponding zone. A sensor network configuration is changed for one or more zones based on the wireless communication performance of the sensor network.

20 Claims, 8 Drawing Sheets

(56) References Cited

U.S. PATENT DOCUMENTS

| | | | |
|---|---|---|---|
| 11,137,762 B2 | 10/2021 | Zhang et al. | |
| 11,153,720 B1 | 10/2021 | Newton et al. | |
| 11,154,220 B2 | 10/2021 | Nakagawa et al. | |
| 11,246,010 B2 | 2/2022 | Mao et al. | |
| 11,302,031 B2 | 4/2022 | Shin et al. | |
| 11,503,433 B2 | 11/2022 | Mohan et al. | |
| 2007/0265866 A1* | 11/2007 | Fehling | G06Q 10/08 340/506 |
| 2017/0192435 A1* | 7/2017 | Bakhishev | G05D 1/028 |
| 2018/0102858 A1 | 4/2018 | Tiwari et al. | |
| 2021/0264316 A1 | 8/2021 | Zhang et al. | |
| 2021/0279549 A1 | 9/2021 | Spanos et al. | |
| 2021/0319894 A1 | 10/2021 | Sobol et al. | |
| 2022/0007137 A1 | 1/2022 | Choi et al. | |
| 2022/0141619 A1 | 5/2022 | Parikh et al. | |
| 2022/0171820 A1 | 6/2022 | Neun et al. | |
| 2024/0069144 A1 | 2/2024 | Gao | |

FOREIGN PATENT DOCUMENTS

| | | | | |
|---|---|---|---|---|
| CN | 107396322 B | 12/2019 | | |
| CN | 110891241 A | 3/2020 | | |
| CN | 112165684 B | 9/2021 | | |
| CN | 113639755 A | 11/2021 | | |
| CN | 113640740 A | 11/2021 | | |
| CN | 113873423 A | 12/2021 | | |
| CN | 112423265 B | 4/2022 | | |
| CN | 113347559 B | 4/2022 | | |
| CN | 114449452 A | 5/2022 | | |
| EP | 3163315 A1 | * | 5/2017 | G01S 5/16 |
| KR | 101975117 B1 | 5/2019 | | |
| KR | 20220141619 A | 10/2022 | | |
| WO | 2019134549 A1 | 7/2019 | | |

OTHER PUBLICATIONS

Houssaini et al., "Performance Analysis of Received Signal Strength and Link Quality in Wireless Sensor Networks, " 2018, IEEE 2018 15th International Multi-Conference on Systems, Signals and Devices, pp. 173-178. (Year: 218).*

Guanglin Tang et al., "Bluetooth Low Energy Technology and Deep Learning to Facilitate Clinical Applications", Medical Artificial Intelligence and Automation (MAIA) Laboratory, Department of Radiation Oncology, University of Texas Southwestern Medical Center, Dallas, TX 75235, United States of America, 2020.

* cited by examiner

|  | s2sRFLOSS Data Table: mean |  |  |  |
|---|---|---|---|---|
|  | Receiving Sensors | | | |
| Beaconing Sensor | Sensor 1 | Sensor 2 | ... | Sensor 12 |
| Sensor 1 | NaN | -60 | ... | -99 |
| Sensor 2 | -65 | NaN | ... | -90 |
| ... | ... | ... | ... | ... |
| Sensor 9 | -77.22 | -80.34 | ... | -85 |
| Sensor 10 | -70.33 | -84.64 | ... | -80 |

|  | Zone_0 RF Fingerprint 1 : mean |  |  |  |
|---|---|---|---|---|
|  | Receiving Sensors | | | |
| Beaconing Sensor | Sensor 1 | Sensor 2 | ... | Sensor 12 |
| Sensor 9 | -77.22 | -80.34 | ... | -85 |
| Sensor 10 | -70.33 | -84.64 | ... | -80 |

|  | Zone_0 RF Fingerprint 1 : mean |  |  |  |
|---|---|---|---|---|
|  | Receiving Sensors | | | |
| Beaconing Sensor | Sensor 1 | Sensor 2 | ... | Sensor 12 |
| Sensor 9 | -77.22 | -80.34 | ... | -110.32 |
| Sensor 10 | -70.33 | -84.64 | ... | -95.96 |
|  | Zone_0 RF Fingerprint 2 : standard deviation (sigma) | | | |
|  | Receiving Sensors | | | |
| Beaconing Sensor | Sensor 1 | Sensor 2 | ... | Sensor 12 |
| Sensor 9 | 4.50 | 3.22 | ... | 8.30 |
| Sensor 10 | 5.03 | 3.74 | ... | 7.09 |
|  | Zone_0 RF Fingerprint 3 : Reception rate | | | |
|  | Receiving Sensors | | | |
| Beaconing Sensor | Sensor 1 | Sensor 2 | ... | Sensor 12 |
| Sensor 9 | 66.5% | 62.4% | ... | 27.33% |
| Sensor 10 | 47.6% | 40.33% | ... | 32.24% |

RSSI: mean floorplan fingerprint

$$\begin{bmatrix} \mu_{RSSI}^{1,1} & \mu_{RSSI}^{1,2} & \cdots & \mu_{RSSI}^{1,12} \\ \mu_{RSSI}^{2,1} & \mu_{RSSI}^{2,2} & \cdots & \mu_{RSSI}^{2,12} \\ \vdots & \vdots & \ddots & \vdots \\ \mu_{RSSI}^{12,1} & \mu_{RSSI}^{12,2} & \cdots & \mu_{RSSI}^{12,12} \end{bmatrix}$$

$$f_\mu^{z1}$$

RSSI: sigmas floorplan fingerprint

$$\begin{bmatrix} \sigma_{RSSI}^{1,1} & \sigma_{RSSI}^{1,2} & \cdots & \sigma_{RSSI}^{1,12} \\ \sigma_{RSSI}^{2,1} & \sigma_{RSSI}^{2,2} & \cdots & \sigma_{RSSI}^{2,12} \\ \vdots & \vdots & \ddots & \vdots \\ \sigma_{RSSI}^{12,1} & \sigma_{RSSI}^{12,2} & \cdots & \sigma_{RSSI}^{12,12} \end{bmatrix}$$

$$f_\sigma^{z1}$$

RSSI: reception rate floorplan fingerprint

$$\begin{bmatrix} \gamma_{RSSI}^{1,1} & \gamma_{RSSI}^{1,2} & \cdots & \gamma_{RSSI}^{1,12} \\ \gamma_{RSSI}^{2,1} & \gamma_{RSSI}^{2,2} & \cdots & \mu_{RSSI}^{2,12} \\ \vdots & \vdots & \ddots & \vdots \\ \gamma_{RSSI}^{12,1} & \gamma_{RSSI}^{12,2} & \cdots & \gamma_{RSSI}^{12,12} \end{bmatrix}$$

$$f_\gamma^{z1}$$

$$D^{t1,t2} = \alpha * D_\mu(f_\mu^{t1}, f_\mu^{t2}) + \beta * D_\sigma(f_\sigma^{t1}, f_\sigma^{t2}) + \varsigma * D_\gamma(f_\gamma^{t1}, f_\gamma^{t2})$$

Where:
$D^{t1,t2}$: Fingerprint distance between time1 and time2
$\alpha, \beta, \varsigma$: are weights given to each individual fingerprint and sum to 1

*Fig. 8*

SYSTEM AND METHOD FOR MONITORING A SENSOR NETWORK

FIELD OF THE INVENTION

This application relates to the field of asset tracking systems and, more particularly, to a sensor monitoring system of a group of radio frequency (RF) sensors for asset tracking.

BACKGROUND

Building management systems encompass a wide variety of equipment that aid in monitoring and controlling building operations. Building management systems often include one or more environmental control sub-systems, such as security, fire safety, lighting, heating, ventilation, and air conditioning ("HVAC") systems. The systems may also provide non-environmental control features for management and occupants of a building, such as indoor location tracking of assets (including occupants).

Sensor monitoring systems may include sensors positioned throughout a structure to detect building activity, such as occupancy detection and asset tracking. Unfortunately, these sensors might be installed improperly, recorded inaccurately, or otherwise fail to operate according to specifications. For example, a technician may install a sensor improperly, interchange the locations of two or more sensors, or mislabel a floor or ceiling plan intended to reflect sensor locations. Sensors may also lack sufficient precision since different structures may have different objects and conditions. Sensors may become misaligned or otherwise malfunction over time. After installation or whenever issues are observed, a technician is sent on-site at the structure to perform visual observations and manual tasks to identify problems and address them. Such attempts can be time-consuming, costly, and produce mediocre or even erroneous results. Detection of malfunctioning sensors or out of specification conditions also presents a challenge because of the sensor monitoring system's statistical nature. The system's performance could deteriorate over time due to the sub-optimum performance of a small number of sensors without detection.

SUMMARY

In accordance with at least one embodiment of the disclosure, a sensor monitoring system approach for asset tracking is provided.

One aspect is a system for monitoring a sensor network comprising multiple sensors and an upstream device communicating with the sensors. Sensor pairs of the sensors include a transmitting sensor and a receiving sensor for each sensor pair. Each sensor of the multiple sensors is assigned as the transmitting sensor in turn. The sensors collecting signal strength data for each sensor pair corresponding to beacons transmitted by each transmitting sensor and received by each receiving sensor. The upstream device generates an aggregate fingerprint based on the signal strength data, generates a zone fingerprint for each zone of multiple zones based on the aggregate fingerprint, and determines a wireless communication performance of the sensor network based on the zone fingerprints of the zones. Each zone fingerprint includes the signal strength value for each pair of transmitting and receiving sensors of the corresponding zone. A sensor network configuration is changed for one or more zones based on the wireless communication performance of the sensor network.

Another aspect is a method for monitoring a sensor network. Signal strength data for sensor pairs of multiple sensors is collected. Each sensor pair includes a transmitting sensor and a receiving sensor. Each sensor is assigned as the transmitting sensor in turn. The signal strength data for each sensor pair corresponds to beacons transmitted by each transmitting sensor and received by each receiving sensor. An aggregate fingerprint is generated based on the signal strength data, by a remote device communicating with the sensors. A zone fingerprint is generated for each zone of multiple zones based on the aggregate fingerprint. Each zone fingerprint includes the signal strength value for each pair of transmitting and receiving sensors of the corresponding zone. A wireless communication performance of the sensor network is determined based on the zone fingerprints of the zones. A sensor network configuration is changed for one or more zones based on the wireless communication performance of the sensor network.

The above-described features and advantages and others will become more readily apparent to those of ordinary skill in the art by reference to the following detailed description and accompanying drawings. While it would be desirable to provide one or more of these or other advantageous features, the teachings disclosed herein extend to those embodiments that fall within the scope of the appended claims, regardless of whether they accomplish one or more of the advantages as mentioned above.

BRIEF DESCRIPTION OF THE DRAWINGS

For a more complete understanding of the present disclosure and the advantages thereof, reference is now made to the following descriptions taken in conjunction with the accompanying drawings, wherein like numbers designate like objects.

DETAILED DESCRIPTION

Various technologies that pertain to systems and methods that facilitate sensor network monitoring will now be described with reference to the drawings, where like reference numerals represent like elements throughout the disclosure. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is understood that functionality described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

The sensor network monitoring system includes a set of statistics-based sensor network monitoring ("SNM") techniques, also known as RSSI RF-LOSS techniques, that provide these features. The techniques first verify each deployed sensor's zone association based on their location recorded at the deployment. The sensors' performance, such as Tx and Rx efficiency and reception rate, is also tested and verified. Then, the fingerprint of each zone is created from the RFLOSS data. The sensor network monitoring system has a variety of applications, such as a Real-time Location System (RTLS). After deployment, these techniques operate on demand when the RTLS system performance is deteriorating or regularly maintaining the RTLS's integrity.

The sensor monitoring system of a structure, such as a building, may have devices positioned throughout the structure. Each device may be assigned to a designated location of the structure and include a radio frequency (RF) sensor. The RF sensors may communicate with each other and measure radio signal path loss from one sensor to another. Radio signal path loss is determined by a sensor or upstream device, and one or more actions may be taken to compensate for the RF loss differential and/or address any issues indicated by the differential.

Radio signals suffer attenuation when they travel from a transmitter to a receiver in a somewhat unpredictable way, resulting in radio signal path loss. The path loss reduces the power density of an electromagnetic wave as it propagates through an environment. The path loss may occur as a result of traveling through free space, atmospheric conditions, and intermediate objects and reflecting from surrounding objects. For example, in free space, signals diminish in intensity as they propagate away from the transmitter. A structure such as a building environment, walls, furniture, equipment, people, and other obstructions may reflect or absorb, or both reflect and absorb, the radio signals. When a group of sensors is deployed in a specific environment, the sensor monitoring system will measure all the sensors' radio signal path losses and address any issues derived from these measurements.

Figure 1:
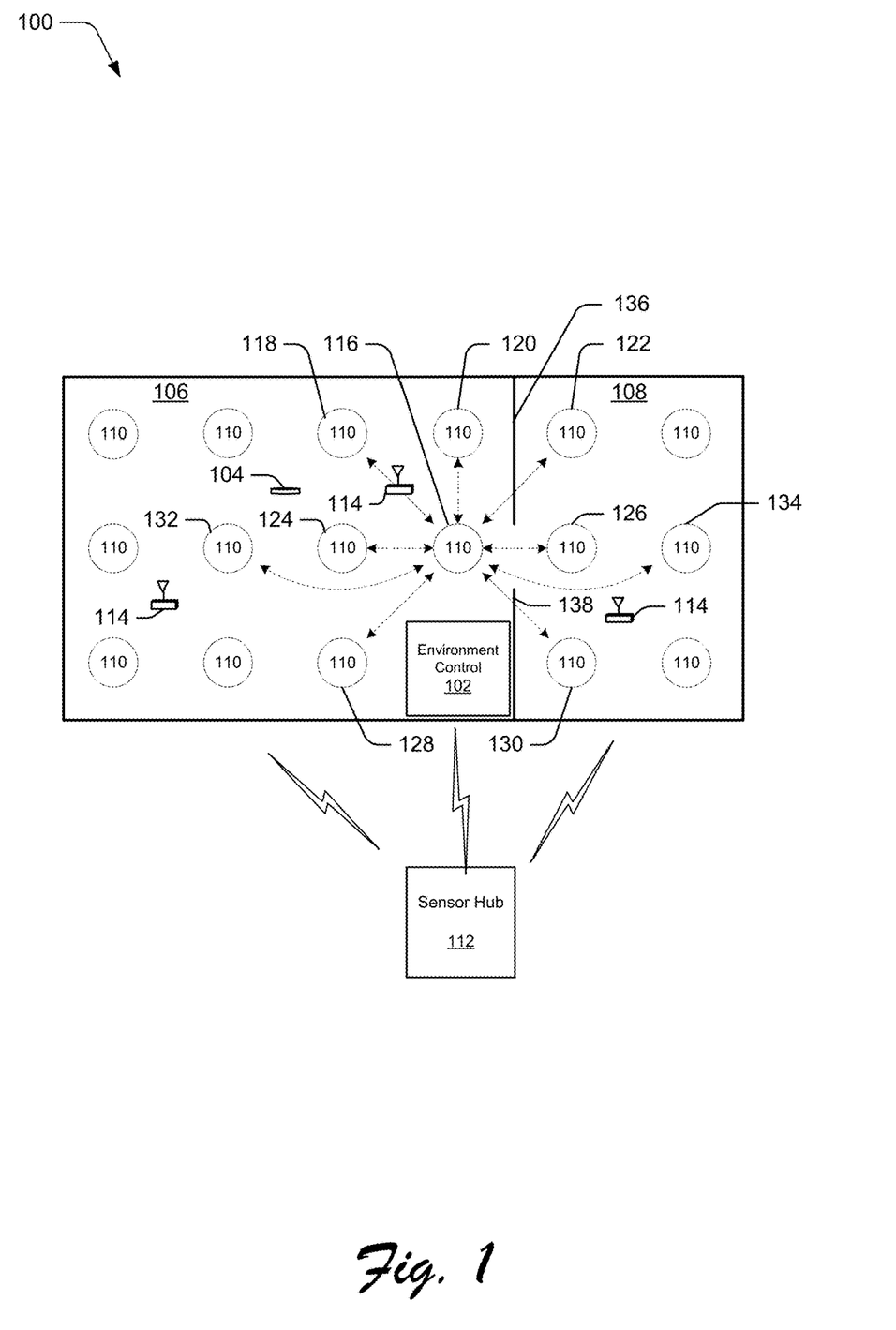
FIG. 1 is an overhead planar view of a sensor network monitoring (SNM) system in an example implementation that is operable to employ techniques described herein.

Referring to FIG. 1, a sensor monitoring system 100 for asset tracking may provide information to a building management system or other management services, such as an environmental control system 102 of a facility, to enhance services provided to building owners, managers, technicians, and occupants. For example, the system 100 may manage the environmental conditions based at least in part on the locations of beacon tags 104, such as those conditions experienced by an occupant or other asset associated with the beacon tag. The sensor monitoring system 100 includes infrastructure 110, 112, 114 to establish locations of one or more beacon tags 104 within a structure, such as an indoor or defined space of a facility. The structure may include various partitioned or designated areas 106, 108 of the structure, such as floors, rooms, hallways, or defined open spaces associated with the structure. Each area 106, 108 of the structure may include devices of the infrastructure such as multiple sensors 110.

For some embodiments, an upstream device, such as a sensor hub 112, may be co-located with some or all sensors within an area 106, 108 of the facility. For other embodiments, the sensor hub may be remote from the sensors and/or the facility. For example, the sensor hub 112 may locate in the Cloud and communicate directly or indirectly with the sensors 110, at least in part, via the Internet or other communication network. The sensor hub 112 communicates directly or indirectly with the sensors 110, and the interconnection between the sensor hub 112 and the sensors may include wired, wireless, or both connections. Some embodiments of the sensor monitoring system 100 may include wired or wireless gateways 114 positioned among the sensors 110 at the facility. The gateways may serve as a communication transponder between the sensor hub 112 and the sensors. Similar to sensors 110 and the sensor hub 112, the gateways 114 may also process data to employ techniques described herein.

The sensors 110 of the infrastructure may be positioned at fixed locations throughout the area 106, 108. The sensors 110 may be evenly distributed throughout each area 106, 108, or selectively distributed in a non-even manner, as may be preferred for beacon tag detection. The sensors 110 are configured to detect beacons broadcast by one or more sources associated with assets' positions. For example, occupants may carry the beacon tags 104 for detection by the sensors 110, among other purposes, to facilitate tracking of the devices. Each of the beacon tags 104 may be any type of transportable device capable of wireless communication with sensors 110 of the facility. Examples of beacon tags 104 include, but are not limited to, tags, wearables, wireless communication devices, tablets, portable computing devices, and any other type of transportable device that includes circuitry for transmitting a beacon.

As illustrated by FIG. 1, the sensor monitoring system 100 includes multiple sensors 110 capable of communicating with each other via wireless communications, such as radio frequency (RF) signals. Examples of wireless communications include, but are not limited to, Bluetooth (including BLE), the ultrawideband (UWB). Wi-Fi (including Wi-Fi Direct), cellular, satellite, mesh networks, PAN, WPAN, WAN, Zigbee, near-field communications, and other types of radio communications and their variants. For any given sensor 110 of the system 100, a transmitting sensor 116 may be positioned at a transmitting sensor location within the structure, and one or more proximal receiving sensors 118, 120, 122, 124, 126, 128, 130 may be positioned at receiving sensor locations within the structure proximally adjacent to the transmitting sensor. For some embodiments, one or more distal receiving sensors 132, 134 may be positioned at receiving sensor locations within the structure proximally further from the transmitting sensor 116, in which one or more proximal receiving sensors 118, 120, 122, 124, 126, 128, 130 are, at least in part, between the transmitting and distal receiving sensors or otherwise closer to the transmitting sensor relative to the distal receiving sensor(s). Each sensor, and its location, is positioned within the reception range of wireless signals transmitted by one or more of the other sensors. It is to be understood that, although a specific sensor is described as a transmitting or first sensor and specific sensors are described as receiving or second sensors, all sensors of the system 100 may be transmitting and/or receiving sensors.

For the sensor monitoring system 100, the transmitting sensor 116 may transmit one or a burst of wireless signals that may be detected or received by one or more sensors 110, such as the proximal receiving sensors 118-130, the distal receiving sensors 132-134, or both. The receiving sensors, such as the proximal or distal receiving sensors 118-134, may determine a measured wireless signal ("wireless signal") and its corresponding value based on the received wireless signals. For example, the measured wireless signal may be a received signal strength indicator (RSSI) or equivalent value if one signal is transmitted, or statistical features based on multiple received signals from the transmitting sensor. Also, an expected wireless signal or expected statistical features based on the location of the transmitting sensor 116 (i.e., transmitting sensor location) and the location of the proximal and/or distal receiving sensors 118-134 (i.e., receiving sensor location) may be determined or otherwise known to the receiving sensors 118-134, a device upstream from the receiving sensor (i.e., upstream device), or both. For example, a distance between the transmitting and receiving sensors 116-134 may be determined from these sensors' location. The distance may be correlated with the expected wireless signal (RSSI, etc.) or the expected statistical features. The locations of a given pair of sensors correspond to an expected wireless signal of those sensors. Examples of the upstream device include, but are not limited to, the sensor hub 112 or the gateway 114.

For embodiments with statistical features, the statistical features based on signals detected or received by the receiving sensor 118-134 or otherwise measured by the system 100 are considered to be detected statistical features, and the statistical features determined by the system 100 are considered to be expected statistical features. The detected and expected statistical features differ in that the expected statistical features are determined independently from the detected wireless signals detected or received at the second sensor 118-134 from the first sensor 116. The methods of determining each expected statistical may be based on, but are not limited to, a known distance between the first and second locations, a floor plan associated with the first and second sensors, or from a predetermined lookup table associated with the first and second sensors.

Statistical features attempt to characterize the distribution of received wireless signals. Received statistical features and expected statistical features include primary statistical features and derived statistical features. Primary statistical features include, but are not limited to, a number of received wireless signals, a sum of received wireless signals, a squared sum of received wireless signals, and a combination of received signals from the wireless signals. Derived statistical features includes, but are not limited to, mean, standard deviation, mode, median, minimum, and maximum values of the received wireless signal. The derived statistical features may be derived or calculated from the primary statistical features. For some embodiments, the division of primary and derived statistical features may be considered to be somewhat artificial for the main purpose of reducing bandwidth. For example, primary statistical features may be computed at one or more sensors and transmitted to an upstream device, and derived statistical features may be calculated based on the primary statistical features to describe the statistical distribution of the wireless signals. Where concerns about bandwidth are minimal, received wireless signals may be transmitted from multiple sensors to the upstream device(s) such that all, or a significant portion, of the statistical analysis may be performed upstream.

Statistical features may be determined at a receiving sensor and/or an upstream device. In particular, received or other statistical features may be determined at a receiving or second sensor 118-134, a gateway 114, the sensor hub 112, in the Cloud, or a combination of these entities. In addition, the received wireless signals or a signal based on the received wireless signals may be provided to the upstream device (such as the sensor hub 112 and/or gateway 114) to determine the primary and/or derived statistical feature or features. For example, primary statistical features may be determined at a receiving sensor, and derived statistical features may be determined at the upstream device. Division and coordination of statistical feature operations may be utilized to minimize network traffic and reduce chances of transmitting errors.

The upstream device 112, 114 may be configured to determine that a difference between the measured wireless signal ("wireless signal") and the expected wireless signal, and/or their corresponding values, exceeds predetermined thresholds and take specific actions. The actions include, but are not limited to, providing a notification to a remote device, communicating signals between sensors, or performing follow-up actions to determine the differential between the signal values. For one embodiment, the upstream device 112, 114 may notify a mobile device associated with a technician or a control center of a building management system to investigate the sensors associated with the abnormal signal value differential. For another embodiment, the upstream device 112, 114 may instigate further communications between the sensors 116-134, beyond the previously communicated wireless signals from the transmitting sensor to the receiving sensor. For example, the transmitting sensor 116 may transmit wireless signals to other sensors (whether a proximal or distal receiving sensor 118-134) associated with the signal value differential, or vice versa. In doing so, the system may determine whether either sensor locates at an expected location relative to the other sensor, corresponds to a location indicated by a floor or ceiling plan, or otherwise operates as expected. A non-RF signal, such as a light or audio-based signal, may be used for further communication to compensate for any RF signal's inadequacies previously communicated between the sensors. For yet another embodiment, the upstream device 112, 114 may identify an obstruction between the sensors 116-134, such as a structural object, a movable object, or a live object. Examples of a structure object include a wall, partition, or overhang; examples of a movable object include furniture, equipment, or personal items; and examples of live objects include humans, bugs, and other animals. For yet another embodiment, the upstream devices 112, 114, or other may identify that one or more sensors in the environment 106, 108 are malfunctioned, out of calibration, or otherwise transmitting or receiving signals abnormally. These sensors need to be reset, recalibrated, serviced or replaced to maintain the system's integrity.

The sensor monitoring system 100 may identify obstructions within the structure, such as the structural objects, movable objects, and live objects described above. By determining that a difference between the measured wireless signal and the expected wireless signal, and/or their corresponding values, exceeds a predetermined threshold, the upstream device 112, 114 may determine that an obstruction exists between the transmitting sensor 116 and the receiving sensor (such as the proximal receiving sensor 118-130 or the distal receiving sensor 132-134). For example, as illustrated in FIG. 1, a first obstruction 136 may exist between the transmitting sensor 116 and the receiving sensor 122. A second obstruction 138 may exist between the transmitting sensor 116 and the receiving sensor 130. The signal value differential may indicate the obstruction(s) 136, 138, and the upstream device 112, 114 may take the appropriate response.

The sensor monitoring system 100 may expect one or more obstructions within the structure, particularly if indicated by a floor or ceiling plan. By determining that a difference between the measured wireless signal and the expected wireless signal exceeds a predetermined threshold, the upstream device 112, 114 may determine that it is contradictory that the obstruction does exist between the transmitting sensor 116 and the receiving sensor (such as the proximal receiving sensor 118-130 or the distal receiving sensor 132-134) in a situation where the obstruction should exist. For example, as illustrated in FIG. 1, a first obstruction 136 may exist between the transmitting sensor 116 and the receiving sensor 122. A second obstruction 138 may exist between the transmitting sensor 116 and the receiving sensor 130, or both. The signal value differential may indicate a lack of the obstruction(s) 136, 138 (i.e., fail to indicate the existence of the obstruction), which may be caused, for example, by misplacement of sensors or incorrectly mapping of a sensor on a floor or ceiling plan. In response, the upstream devices 112, 114 may take appropriate actions.

A sensor might demonstrate signal differentials between measured wireless signal and expected wireless signal, explained above, that exceed the thresholds, or otherwise determined as abnormal, consistently when multiple sensors are transmitting while the sensor is receiving. That might indicate the sensor's receiving capability is abnormally comparing to the specification. When a sensor is transmitting, other sensors might demonstrate signal differentials that exceed the thresholds or otherwise be determined as abnormal. That behavior might indicate the transmitting capability is abnormal. In these cases, the upstream devices 112, 114 might also take appropriate actions.

Figure 2:
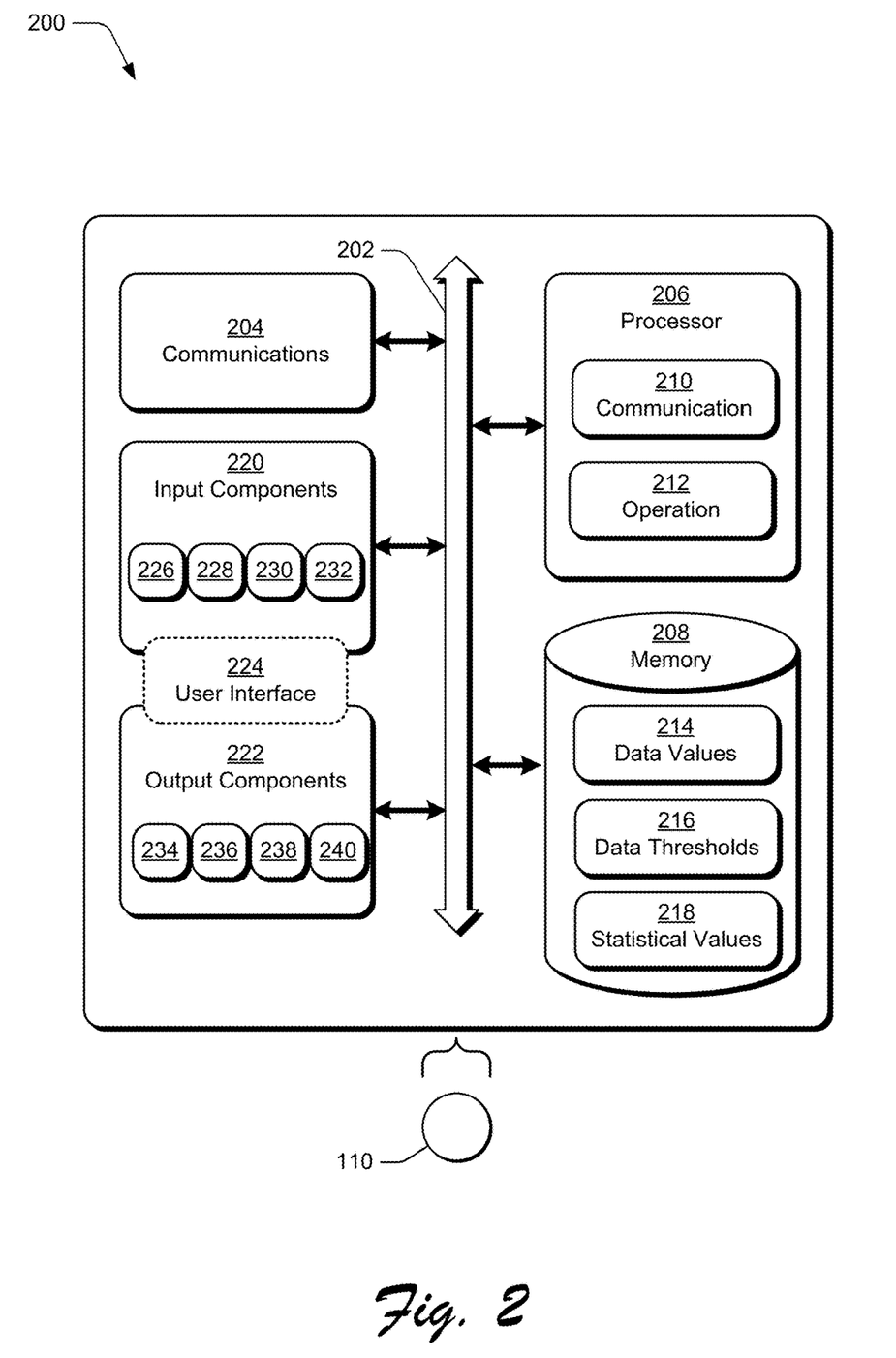
FIG. 2 is a block diagram of example components of a sensor of FIG. 1.

FIG. 2 represents example device components 200 of a sensor, such as a sensor 110 of the sensor monitoring system 100, for asset tracking of beacon tags. The device components 200 of the sensor comprise a communication bus 202 for interconnecting other device components directly or indirectly. The other device components include one or more communication components 204 communicating with other entities via a wired or wireless network, one or more processors 206, and one or more memory components 208.

The communication component 204 of the sensor is configured to communicate with another sensor's communication component and receive a beacon broadcast from a beacon tag or another sensor. The communication component 204 may utilize wireless technology for communication, such as radio frequency (RF), infrared, microwave, light wave, and acoustic communications. RF communications include, but are not limited to. Bluetooth (including BLE), ultra-wideband (UWB), Wi-Fi (including Wi-Fi Direct), Zigbee, cellular, satellite, mesh networks, PAN, WPAN, WAN, near-field communications, and other types of radio communications and their variants. For some embodiments, the communication component 204 of the device components 200 may also utilize wired technology for communication, such as the transmission of data over a physical conduit. e.g., an electrical or optical fiber medium. Each sensor may include more than one communication component 204. For example, a sensor may include a communication component for receiving the beacon from a beacon tag, a communication component for RF communication with another sensor, and a communication component for non-RF communication with the other sensor.

The processor 206 may execute code and process data detected or received from other components of the device components 200, such as information received at the communication component 204 or stored at the memory component 208. The code associated with the sensor monitoring system 100 and stored by the memory component 208 may include but is not limited to, operating systems, applications, modules, drivers, and the like. An operating system includes executable code that controls basic functions of the sensor, such as interactions among the various components of the device components 200, communication with external devices via the communication component 204, and storage and retrieval of code and data to and from the memory component 208.

Each application includes executable code to provide specific functionality for the processor 206 and/or remaining components of the sensor. Examples of applications executable by the processor 206 include, but are not limited to, a communications module 210 to perform communication operations with other sensors, receiving the transmission from proximal beacon tags, and transmitting collected and/or calculated data to one or more upstream devices, and an operation module 212 to perform general and specific operations at the sensor. For some embodiments, the operation module 212 may determine a difference between the measured wireless signal and the expected wireless signal (or their corresponding statistical features and expected statistical feature values). The operation module 212 of each receiving sensor may also determine a signal strength value, a signal strength sum value, and a signal strength squared value of a received beacon.

Data stored at the memory component 208 is information that may be referenced or manipulated by an operating system or application for performing functions of the sensor. Examples of data associated with the sensor monitoring system 100 and stored by the memory component 208 may include, but are not limited to, data values 214 such as expected wireless signals and measured wireless signals and data thresholds 216 such as the predetermined threshold to be compared with the difference between the measured and expected wireless signals. The statistical data values 218 might include, but not limited to, the number of received RF signals, the sum of the received RF signals, the sum of squared RF received signals, and possibly the individual received signal.

The device components 200 of each sensor 110 may include one or more input components 220 and one or more output components 222. The input components 220 and output components 222 of the device components 200 may include one or more visual, audio, mechanical, or other components. For some embodiments, the input and output components 220, 222 of each sensor 110 may include a user interface 224 for interaction with a device user. The user interface 224 may include hardware and software to provide a user with the desired user experience. Examples of input components 220 include, but are not limited to, a light sensor 226 (such as a passive infrared sensor), audio sensor 228 (such as a microphone), motion sensor 230, atmospheric sensor 232 (such as temperature, humidity, pressure, etc.), and a combination of sensing technologies. Examples of output components 220 include, but are not limited to, displays 234, visual indicators 236, audio speakers 238, mechanical actuators 240, and a combination of output technologies.

It is to be understood that FIG. 2 is provided for illustrative purposes to represent examples of the device components 200 of a sensor 110. It is not intended to be a complete diagram of the various components utilized by the device. Therefore, sensor 110 may include various other components not shown in FIG. 2, may include a combination of two or more components, or a division of a particular component into two or more separate components, and still be within the scope of the present invention.

Figure 3:
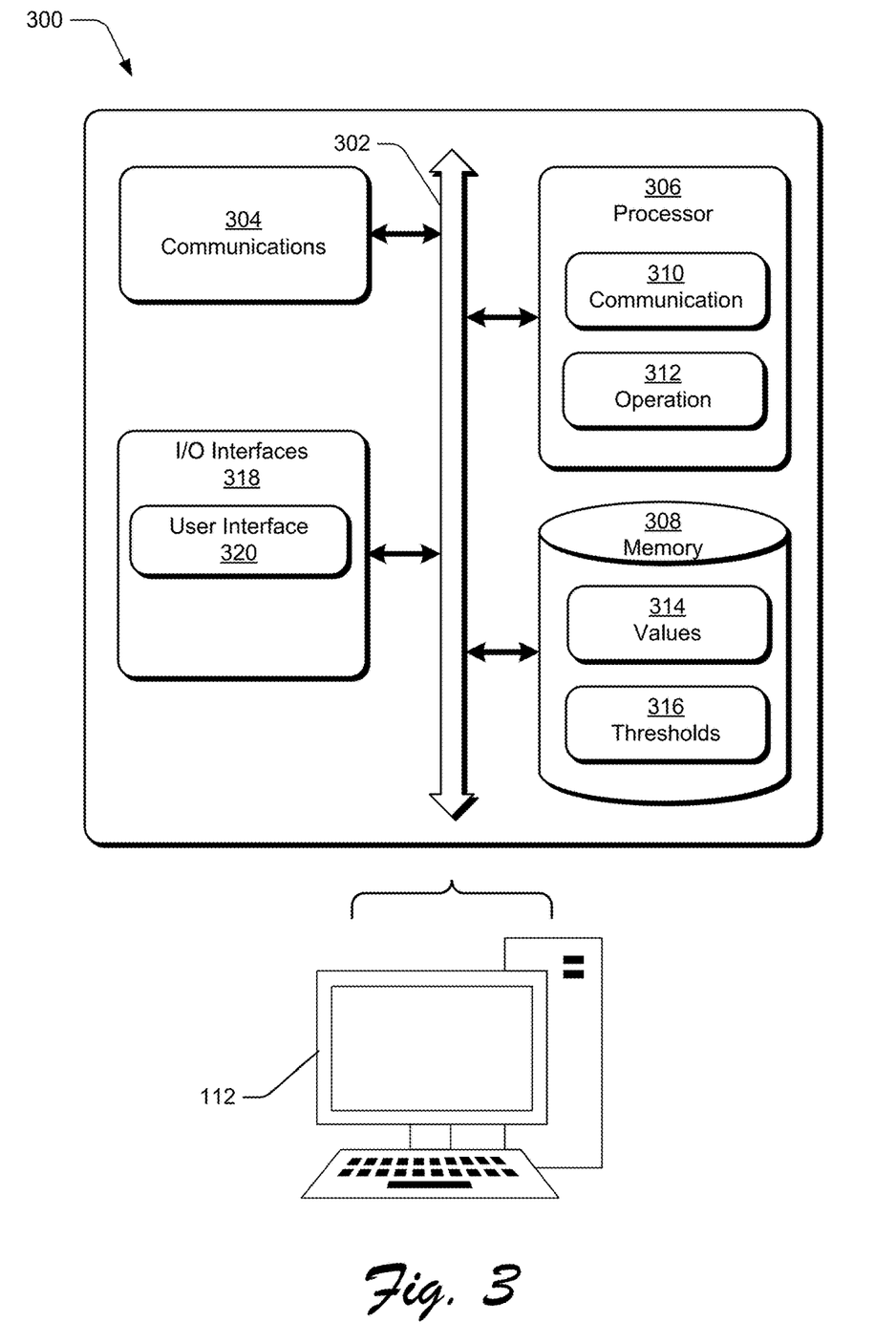
FIG. 3 is a block diagram of example components of an upstream device of FIG. 1.

FIG. 3 represents example device components 300 of an upstream device, such as the sensor hub 112 or the gateway 114 of the sensor monitoring system 100, for asset tracking of beacon tags. The device components 300 of the upstream device 112, 114 comprise a communication bus 302 for interconnecting other device components directly or indirectly. The other device components include one or more communication components 304, communicating with other entities via a wired or wireless network, one or more processors 306, and one or more memory components 308. The communication component 304 is configured to communicate with multiple sensors 110, either directly or via one or more other upstream devices. The communication component 304 may utilize wireless technology, wired technology, or a combination of these technologies for communication with other devices, similar to the sensors described above in reference to FIG. 2.

The processor 306 may execute code and process data detected or received from other components of the device components 300, such as information received at the communication component 304 or stored at the memory component 308. The code associated with the sensor monitoring system 100 and stored by the memory component 308 may include, but is not limited to, operating systems, applications, modules, drivers, and the like. An operating system includes executable code that controls basic functions of the upstream device 112, 114, such as interactions among the various components of the device components 300, communication with external devices via the communication component 304, and storage and retrieval of code and data to and from the memory component 308.

Each application includes executable code to provide specific functionality for the processor 306 or remaining components of the upstream device 112, 114, or both. Examples of applications executable by the processor 306 include, but are not limited to, a communications module 310 to perform communication operations directly or indirectly with the sensors 110 and an operation module 312 to perform calculations on the collected data and determine a wireless communication performance of the sensor network. The communication operations might include receiving collected data or calculated data, or both, from the sensors, transmitting calculated results to the sensors, instructing the sensor to perform general and specific operations determined by operation model 312. For some embodiments, the operation module 312 may determine a difference between the measured wireless signal and the expected wireless signal (such as statistical features), or furthermore, to determine whether the difference exceeds a predetermined threshold.

Data stored at the memory component 308 is information that may be referenced and manipulated by an operating system or application for performing functions of the upstream device 112, 114. Examples of data associated with the sensor monitoring system 100 and stored by the memory component 308 may include, but are not limited to, data values 314 such as expected wireless signals and measured wireless signals and data thresholds 316 such as the predetermined threshold to be compared with the difference between the measured and expected wireless signals. The data value 314 may also include information used to determine the expected wireless signals, such as a ceiling or floor plan of an area of the structure, locations of the sensors 110, and distances between pairs of sensors.

The data value 314 may also include, but not limited to, the statistical values, such as the number of RF signal received, the sum of all received RF signals, the sum of squared RF signals. If possible, the individual received RF signal values.

The device components 300 of each upstream device 112, 114 may include one or more input and output components, i.e., I/O interfaces 318. The I/O interfaces 318 of the device components 300 may include one or more visual, audio, mechanical, or other components. For some embodiments, the I/O interfaces 318 of each upstream device 112, 114 may include a user interface 320 for interaction with a device user. The user interface 320 may include a combination of hardware and software to provide a user with the desired user experience. For example, the user interface 320 may include one or more input components to allow the user to enter information, such as mechanical buttons or audio input, and one or more output components to provide information to the user, such as a visual or audio indicator to show an operational status of the upstream device 112, 114.

It is to be understood that FIG. 3 is provided for illustrative purposes only to represent examples of the device components 300 of an upstream device 112, 114 and is not intended to be a complete diagram of the various components that the device may utilize. Therefore, upstream devices 112, 114 may include various other components not shown in FIG. 3, may include a combination of two or more components, or a division of a particular component into two or more separate components, and still be within the scope of the present invention.

Figure 4:
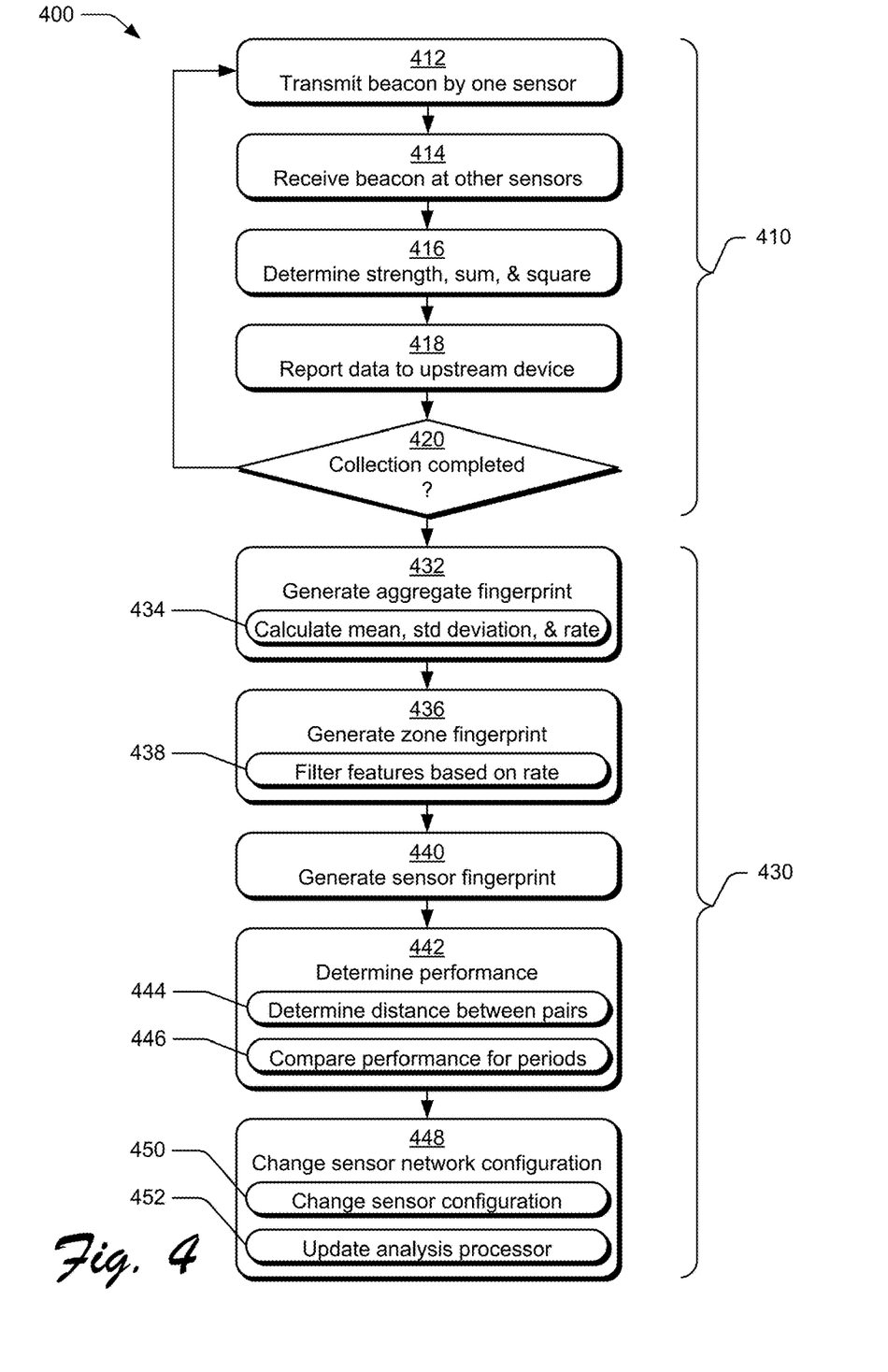
FIG. 4 is a flow diagram a production operation in an example implementation of the SNM system of FIG. 1.

Referring to FIG. 4, a flow diagram represents an example process or system operation 400 of the sensor monitoring system 100. The process 400 monitors the health of a sensor network over time to ensure that the ML process will operate optimally as originally deployed. The process 400 also serves as a predictor of how the ML will perform in a specific environment. Further, if there are changes to the environment over time, then the process 400 detects the changes and drive subsequent actions, such as re-collect data from the environment, rezone the environment, add more sensors, and the like.

The process 400 of a sensor monitoring system for monitoring a sensor network including a collection subprocess 410 and an analysis subprocess 430. For the collection subprocess 410, signal strength data for sensor pairs of multiple sensors is collected (412, 414). Each sensor pair including a transmitting sensor and a receiving sensor, and each sensor is assigned as a transmitting sensor in turn. Each sensor serves as the transmitting sensor sequentially and transmits (412) a beacon. Thus, each sensor gets a turn as the transmitting sensor. The other non-transmitting sensors receive (414) from the transmitting sensor in response to the beacon transmission (412). The signal strength data for each sensor pair corresponds to the beacons transmitted by each transmitting sensor and received by each receiving sensor. For some embodiments, each receiving sensor may determine (416) the signal strength value, a signal strength sum value, and a signal strength squared value of the received beacon. In any case, the receiving sensors reporting (418) data to the upstream device, whether the measured data received or the calculated data determined from the measured data. The collection process continues until each sensor has an opportunity to transmit one or more beacons and the other sensors have an opportunity to receive the beacon (420).

For example, for the collection process 410, one sensor on the network transmits a number of RF beacons at a predetermined power level. All other sensors on the network listen and record the number, the sum, and the squared sum of the received RF beacon. The sensors that receive the RF transmissions report a data package representing the sensor-to-sensor RF loss to the system. The process 410 repeats with the next sensor in the network until all sensors in the RTLS have chance to transmit, receive, and report. The collection process 410 may be repeated multiple times to increase the robustness of its results.

For the analysis subprocess 430 of the process 400, the upstream device generates fingerprints, determines performance, and make adjustments to the sensor network. The analysis subprocess 430 generates (432) the aggregate fingerprint based on the signal strength data by a remote device communicating with the sensors. For each sensor pair, a data set captures an RSSI sum value, an RSSI squared sum value, and an RSSI count value. The RSSI sum value is the sum of all RSSI values received. The RSSI squared sum value is the sum of the squares of all received RSSI signals. The RSSI count value is the number of RSSI signals received.

For some embodiments, the aggregate fingerprint is generated by calculating (434) a mean feature, a standard deviation feature, and a reception rate feature for each pair of transmitting and receiving sensors based on the signal strength values of the wireless communication data. The mean feature, the standard deviation feature, and the reception rate feature for each sensor pair may be determined based on the RSSI sum value, the RSSI squared sum value, and the RSSI count value. The reception rate is calculated based on a number of beacons communicated between the corresponding pair of transmitting and receiving sensors. The reception rate may be calculated by dividing the RSSI count value by a MAX_NUM_TX, which is the constant number of beacons each beaconing sensor sends out.

For the analysis subprocess 430 of the process 400, the upstream device generates (436) the zone fingerprint for each zone based on the aggregate fingerprint. For example, zone fingerprints may be generated by partitioning the aggregate fingerprint according to sensor location relative the zone's boundaries. In one variation, each zone fingerprint includes the signal strength data of each pair of transmitting and receiving sensors located inside the zone. In another variation, each zone fingerprint includes the signal strength data of beaconing sensors located inside the zone which are received by all other sensors. In yet another variation, each zone fingerprint includes the signal strength data of receiving sensors located inside the zone. The zone fingerprints are partitioned for each of the three statistical measures, namely mean, standard deviation, and rate.

For some embodiments, the process 400 determines the zone fingerprint includes filtering (438) the mean feature and the standard deviation feature based on the reception rate feature. For example, the mean feature and the standard deviation feature may be filtered by assigning a null value to a particular mean feature or standard deviation feature based on the corresponding reception rate feature being below a threshold rate. The receiving rate data feature may be used to perform filtering (438) on the mean and standard deviation features. When the receiving rate for an entry is below a particular threshold, the data may be considered statistically insignificant and assigned the null value.

For some embodiments, the analysis subprocess 430 of the process 400 may generate (440) a sensor fingerprint for each sensor based on the aggregate fingerprint or the zone fingerprint. For example, the process 400 may determine whether a receiving characteristic of at least one sensor has changed based on the sensor fingerprints. The sensor network configuration for the one or more zones may be changed by changing the sensor network configuration for the zones in response to determining that the distance between a particular pair of sensors does not meet a distance threshold. The aggregate fingerprint captures the characteristics of how a specific sensor receives signals from other sensors in the network.

The sensor fingerprint may be compared to itself over time or with other sensors. By determining the difference between a sensor's fingerprint at installation time to its fingerprint at a maintenance time, the system may determine whether the sensor's receiving characteristics have changed. A significant change may indicate deterioration of sensor performance or change in sensor environment/location. The system may record a similarity between every pair of sensors at a baseline event and the health of the network at a subsequent event to measure the consistency of the network. The system may also observe individual sensors and check the similarity of their fingerprints to all other sensors to identify any distinguishing sensors.

For the analysis subprocess 430 of the process 400, the upstream device determines (442) a wireless communication performance of the sensor network based on, or in response to determining, the zone fingerprints of the zones. The analysis subprocess 430 of the process 400 changes (448) the sensor network configuration for one or more zones based on the wireless communication performance of the sensor network.

For some embodiments, the wireless communication performance of the sensor network may be determined by determining (444) a distance between each pair of zones of the multiple zones. As a result, the sensor network configuration for one or more zones may be changed (448) in response to determining that the distance between a particular pair of zones does not meet a distance threshold.

For some embodiments, the wireless communication performance of the sensor network may be determined (442) by comparing (446) a first performance of the sensor network associated with a deployment period with a second performance of the sensor network associated with a maintenance period. For some embodiments, the sensor network configuration for one or more zones may be changed (448) by changing (450) a sensor network configuration in response to determining that a difference between the first and second performances exceeds a performance threshold. For some embodiments, the sensor network configuration for one or more zones may be changed (448) by updating (452) an analysis processor that determines the wireless communication performance of the sensor network.

Figure 5A:
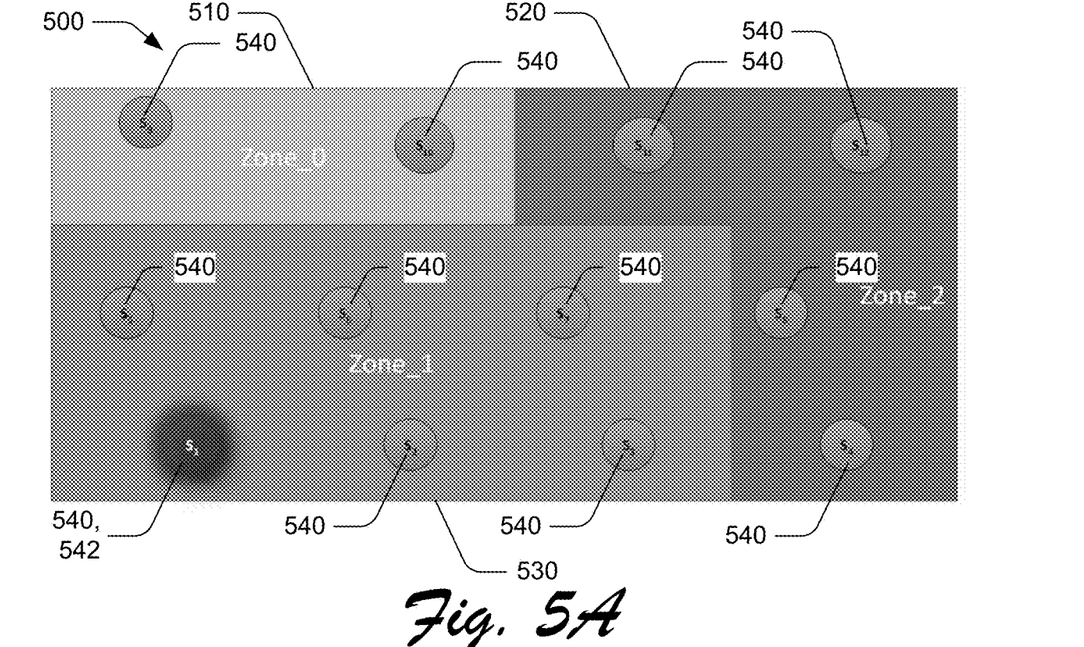
FIGS. 5A and 5B depict example floor plans illustrating the data collection operation of FIG. 4.
Figure 5B:
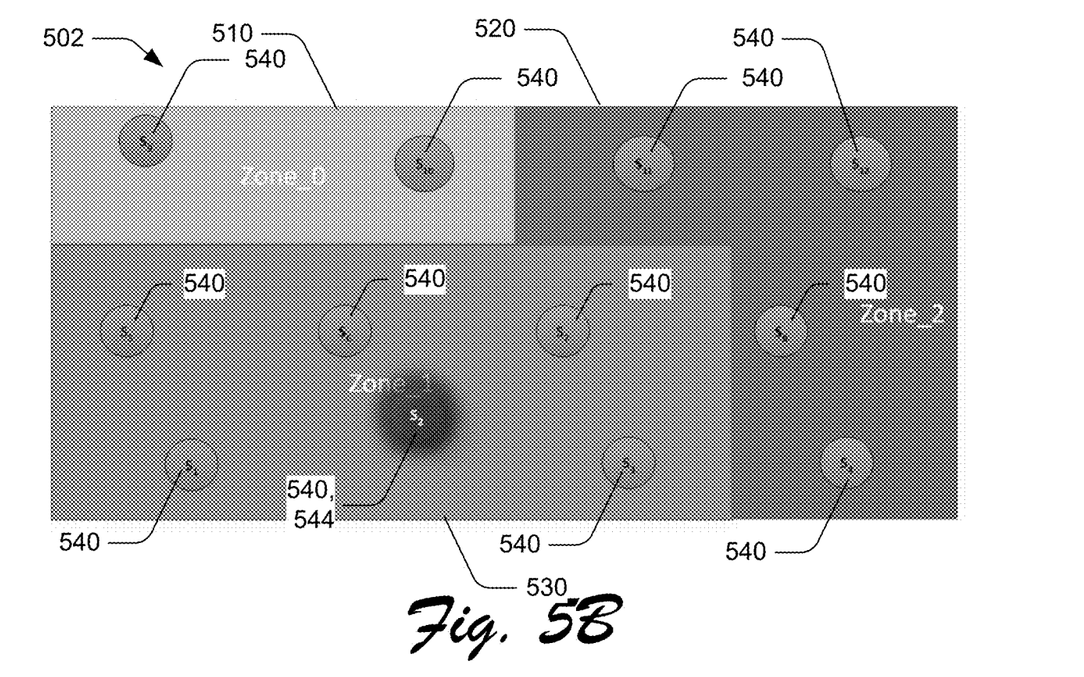

Referring to FIGS. 5A and 5B, there are shown example floor plans 500, 502 illustrating the data collection operation of a facility area having multiple zones. For the example shown, the floor plan 800 includes multiple zones 510, 520, 530. Each sensor 540 transmits beacons and all other sensors listen and record the received beacons. For example, a first sensor 542 may transmit one or more beacons at a given time while sensors other than the first sensor may list and record the beacon(s) and, then, a second sensor 544 may transmit one or more beacons sequentially after the first sensor 542. For some preferred embodiments, the other sensors record three quantities, namely a number, a sum, and a squared sum of the received beacons. The three quantities may be used subsequently to calculate the mean, the standard deviation, and the reception rate for each receiving sensor. All sensors 540 go through the beaconing process in sequential order, and the beaconing process may repeat for the sensors in the same or similar sequential order. This sequential data collection operation does not require an automated device or human-assisted device to move around a floor to perform the data collection. Sensors 540 are placed in beaconing mode to perform the data collection.

Figure 6:
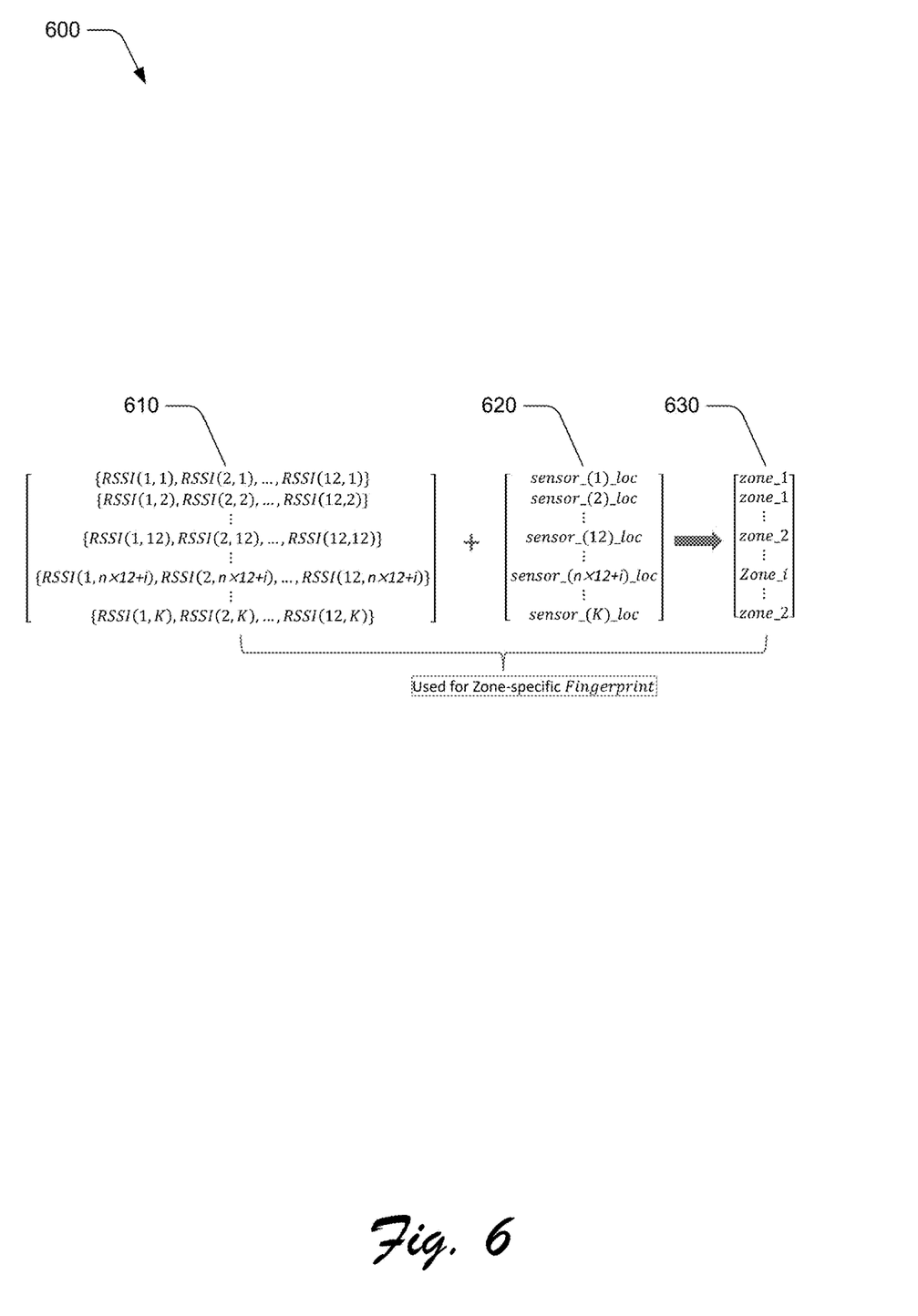
FIG. 6 is a representation of an example dataset generation for the data collection operation of FIG. 4.

Referring to FIG. 6, there is a shown an example dataset 600 for the example data collection operation. This sensor network monitoring process for dataset generation includes an RSSI dataset 610, a data collection location (DCL) dataset 620, and a zone dataset 630. The values are aggregated for each sensor pair, i.e., each pair of transmitting and receiving sensors. For some embodiments, the RSSI dataset 610 includes sums, squared sums, and the number of beacons received. For some embodiments, the mean, standard deviation, and the reception rate may be determined based on the sums, squared sums, and the number of beacons received.

Figure 7A:
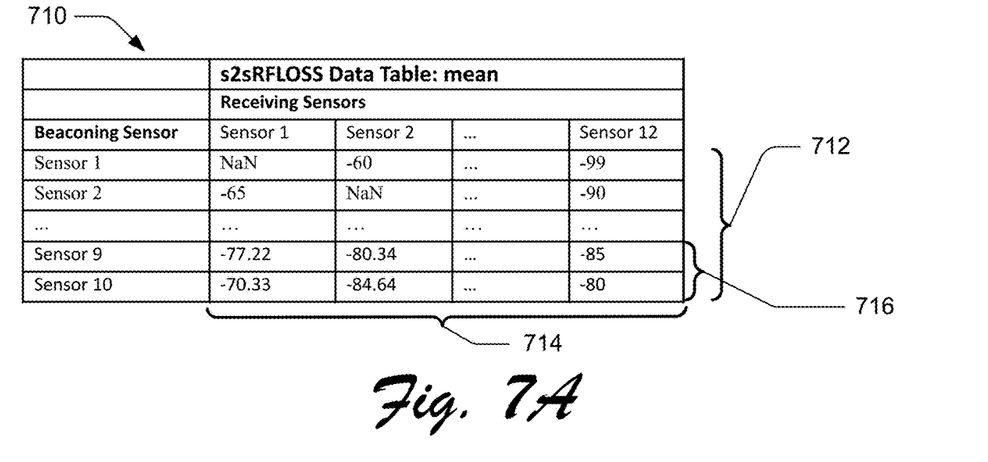
FIGS. 7A, 7B, and 7C are representations of example zone-specific fingerprint data by the data collection operation of FIG. 4.
Figure 7B:
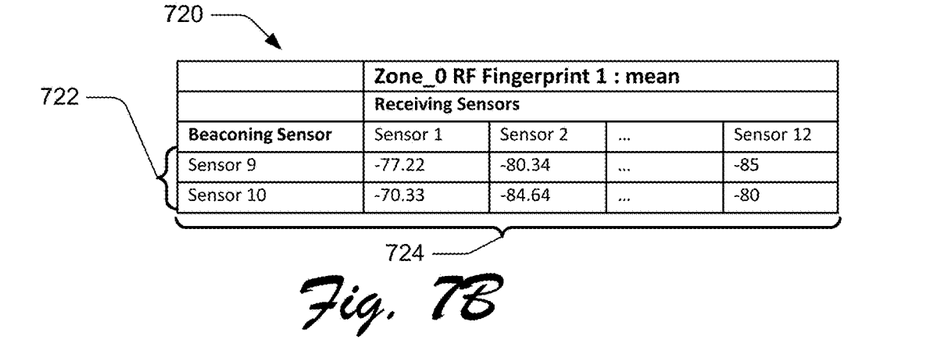
Figure 7C:
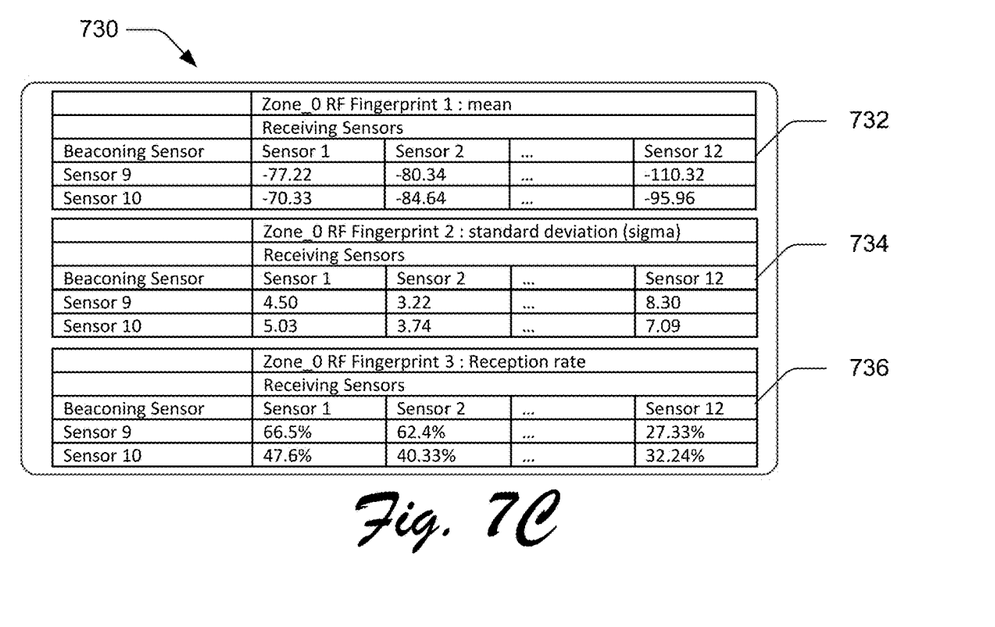

Referring to FIGS. 7A, 7B, and 7C, there are shown example zone-specific fingerprint data by the data collection operation. FIG. 7A, in particular, represents an aggregate data table 710 for the mean collected by various sensors of the system. Similar partitioning is applied to the standard deviation and reception rate components of the sensor-to-sensor data. The aggregate data table 710 includes signal strength values (such as RSSI values) for each sensor of the various sensors. For example, the rows 712 of the aggregate data table 710 identify the signal strength values based on the transmitting sensor, and the columns 714 identify the signal strength values based on the receiving sensors. Since a transmitting sensor does not receive its own because, a null value such as "NaN" may indicate that the transmitting and receiving sensors are one-and-the-same.

An aggregate fingerprint is generated based on the signal strength data by a remote device communicating with the multiple sensors. A zone fingerprint is then generated for each zone based on the aggregate fingerprint. Each zone fingerprint includes the signal strength value for each pair of the transmitting and receiving sensors of the corresponding zone. Accordingly, each aggregate data table is partitioned by zone. For some embodiments, the zone fingerprint are the rows of the data table where the beaconing sensor is inside the zone. For example, for Zone 0, Sensor 9 and Sensor 10 are in the zone and, therefore, the zone fingerprint is part of the zone data table 720 where those two sensors are beaconing. The signal strength values 722 for a particular zone of the zone data table 720 are based on the signal strength values 716 for the particular zone of the aggregate data table 710. For some embodiments, each aggregate data table may be partitioned such that the receiving sensors within a particular zone represent the data for the zone fingerprint. For example, for Zone 0, the columns labeled Sensor 9 and Sensor 10 may represent the zone fingerprint.

For some embodiments, each zone fingerprint includes the signal strength data of each pair of transmitting and receiving sensors located inside the zone. For some embodiments, each zone fingerprint includes the signal strength data of beaconing sensors located inside the zone which are received by all other sensors. For some embodiments, each zone fingerprint includes the signal strength data of receiving sensors located inside the zone. The zone fingerprints are partitioned for each of the three statistical measures, namely mean, standard deviation, and rate.

Each zone fingerprint 730 represents a different zone of the floor map, and the various zone fingerprints may include the same or different number of sensors relative to each other. Each zone fingerprint includes mean values 732, standard deviation values 734, and reception rate values 736. Also, the mean values 732 for each zone fingerprint 730 includes a mean value for each sensor pair associated with the corresponding zone. Likewise, the standard deviation values 734 for each zone fingerprint 730 includes a standard deviation value for each sensor pair associated with the corresponding zone, and the reception rate values 736 for each zone fingerprint 730 includes a reception rate value for each sensor pair associated with the corresponding zone.

Figure 8:
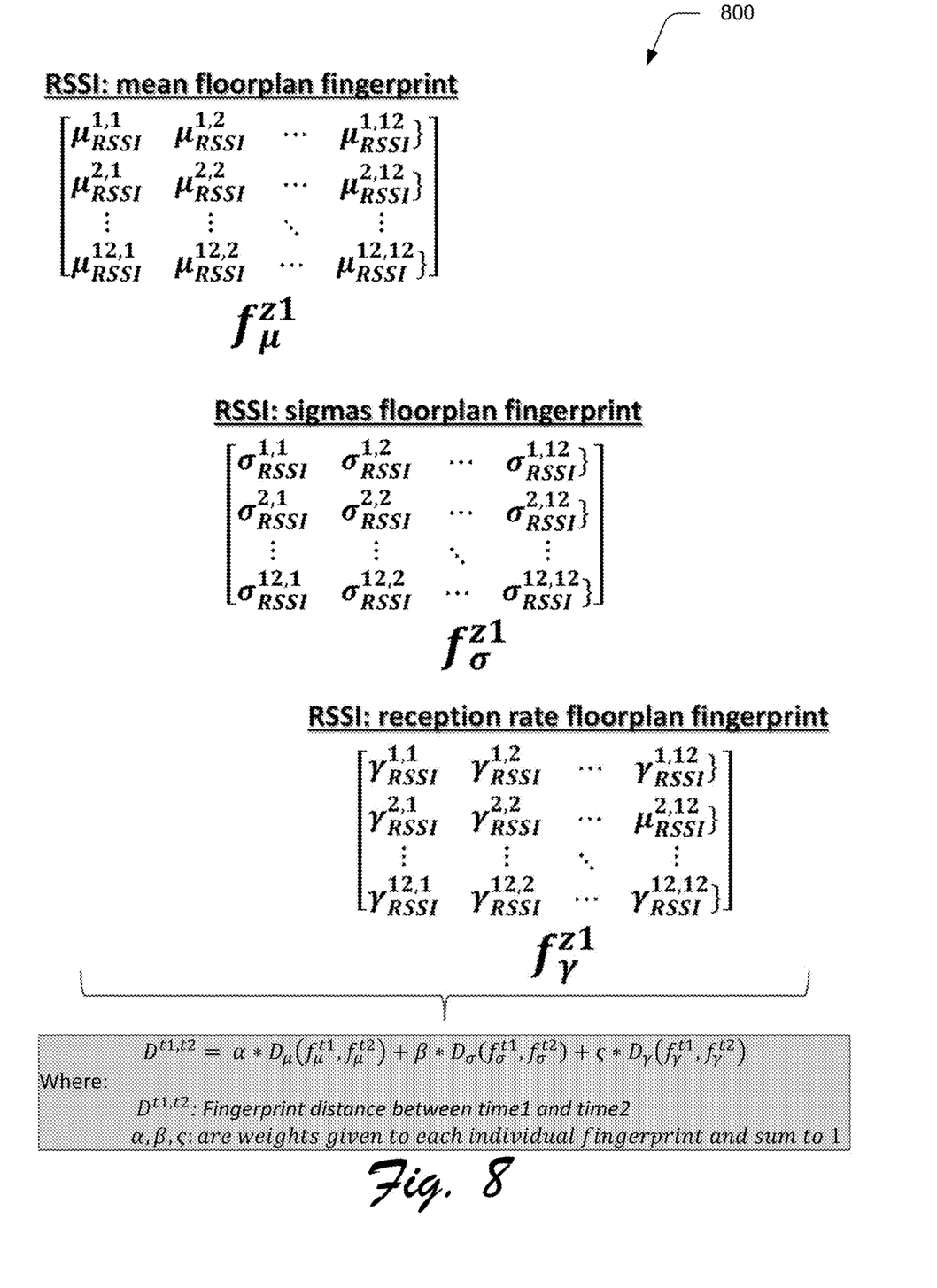
FIG. 8 is a representation of a performance monitoring operation comparing fingerprint data between two different time periods, such as at deployment and post deployment.

Referring to FIG. 8, there is shown a performance monitoring operation 800 comparing fingerprint data between two different time periods. For example, the system may compare the fingerprint determined at deployment time to a fingerprint computed at some time post deployment. The system may detect any significant changes that may impact system performance based on the comparison. The example fingerprint monitoring operation 800 illustrates a fingerprint comparison used to monitoring the sensor network health, such as the consistency of the RSSI data. For example, the fingerprint computed at deployment time may be compared to the fingerprint computed at some time post deployment to detect any significant changes that may impact the performance of the system. An example of a system being impacted is a pre-trained machine learning model that relies on the fact that the sensor network characteristics do not change significantly over time. The analysis processor detects the deviation in the fingerprint. A wireless communication performance of the sensor network may be determined based on the zone fingerprints of the zones. As a result, the sensor network configuration may be changed for one or more zones based on the wireless communication performance of the sensor network.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms. The present disclosure applies equally regardless of the particular type of instruction or signal-bearing medium, or storage medium utilized to carry out the execution. Examples of machine-usable/readable or computer-usable/readable mediums include non-volatile, hard-coded type mediums such as read-only memories (ROMs) or erasable, electrically programmable read-only memories (EEPROMs), and user-recordable type mediums such as floppy disks, hard disk drives, and compact disk read-only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A system for monitoring a sensor network comprising:
sensor pairs of a plurality of sensors including a transmitting sensor and a receiving sensor for each sensor pair, each sensor of the plurality of sensors being assigned as the transmitting sensor in turn, the plurality of sensors collecting signal strength data for each sensor pair corresponding to beacons transmitted by each transmitting sensor and received by each receiving sensor; and
an upstream device communicating with the plurality of sensors, the upstream device generating an aggregate fingerprint based on the signal strength data, generating a zone fingerprint for each zone of a plurality of zones based on the aggregate fingerprint, and determining a wireless communication performance of the sensor network based on the zone fingerprints of the plurality of zones, each zone fingerprint including the signal strength value for each pair of transmitting and receiving sensors of the corresponding zone, and
wherein a sensor network configuration is changed for one or more zones of the plurality of zones based on the wireless communication performance of the sensor network.

2. The system as described in claim 1, wherein each receiving sensor of the plurality of receiving sensors determines the signal strength value, a signal strength sum value, and a signal strength squared value of the received beacon.

3. The system as described in claim 1, wherein the upstream device calculates a mean feature, a standard deviation feature, and a reception rate feature for each pair of transmitting and receiving sensors based on the signal strength values of the wireless communication data, the reception rate being calculated based on a number of beacons communicated between the corresponding pair of transmitting and receiving sensors.

4. The system as described in claim 1, wherein the upstream device filters the mean feature and the standard deviation feature based on the reception rate feature.

5. The system as described in claim 4, wherein the upstream device assigning a null value to a particular mean feature or standard deviation feature based on the corresponding reception rate feature being below a threshold rate.

6. The system as described in claim 1, wherein:
the upstream device determines a distance between each pair of zones of the plurality of zones; and
the sensor network configuration is changed in response to determining that the distance between a particular pair of zones does not meet a distance threshold.

7. The system as described in claim 1, wherein:
the upstream device compares a first performance of the sensor network associated with a deployment period with a second performance of the sensor network associated with a maintenance period; and
the sensor network configuration changes in response to determining that a difference between the first and second performances exceeds a performance threshold.

8. The system as described in claim 1, wherein:
the upstream device compares a first performance of the sensor network associated with a deployment period with a second performance of the sensor network associated with a maintenance period; and
an analysis processor that determines the wireless communication performance of the sensor network is updated.

9. The system as described in claim 1, wherein the upstream device generates a sensor fingerprint for each sensor of the plurality of sensors based on at least one of the aggregate fingerprint or the zone fingerprint.

10. The system as described in claim 9, wherein:
the upstream device determines whether a receiving characteristic of at least one sensor of the plurality of sensors has changed based on the plurality of sensor fingerprints, and
the sensor network configuration changes for the one or more zones of the plurality of zones in response to determining that the distance between a particular pair of sensors does not meet a distance threshold.

11. A method for monitoring a sensor network comprising:
collecting signal strength data for sensor pairs of a plurality of sensors, each sensor pair including a transmitting sensor and a receiving sensor, each sensor of the plurality of sensors being assigned as the transmitting sensor in turn, the signal strength data for each sensor pair corresponding to beacons transmitted by each transmitting sensor and received each receiving sensor;
generating an aggregate fingerprint based on the signal strength data;
generating a zone fingerprint for each zone of a plurality of zones based on the aggregate fingerprint, each zone fingerprint including the signal strength value for each pair of the transmitting and receiving sensors of the corresponding zone; and
determining a wireless communication performance of the sensor network based on the zone fingerprints of the plurality of zones,
wherein a sensor network configuration is changed for one or more zones based on the wireless communication performance of the sensor network.

12. The method as described in claim 11, further comprising determining the signal strength value, a signal strength sum value, and a signal strength squared value of the received beacon.

13. The method as described in claim 11, wherein generating the aggregate fingerprint includes calculating a mean feature, a standard deviation feature, and a reception rate feature for each pair of transmitting and receiving sensors based on the signal strength values of the wireless communication data, the reception rate being calculated based on a number of beacons communicated between the corresponding pair of transmitting and receiving sensors.

14. The method as described in claim 11, wherein generating the zone fingerprint includes filtering the mean feature and the standard deviation feature based on the reception rate feature.

15. The method as described in claim 14, wherein filtering the mean feature and the standard deviation feature includes assigning a null value to a particular mean feature or standard deviation feature based on the corresponding reception rate feature being below a threshold rate.

16. The method as described in claim 11, wherein:
determining the wireless communication performance of the sensor network includes determining a distance between each pair of zones of the plurality of zones; and
changing the sensor network configuration for one or more zones of the plurality of zones includes changing a sensor network configuration in response to determining that the distance between a particular pair of zones does not meet a distance threshold.

17. The method as described in claim 11, wherein:
determining the wireless communication performance of the sensor network includes comparing a first performance of the sensor network associated with a deployment period with a second performance of the sensor network associated with a maintenance period; and changing the sensor network configuration for one or more zones of the plurality of zones includes changing a sensor network configuration in response to determining that a difference between the first and second performances exceeds a performance threshold.

18. The method as described in claim 11, wherein:

determining the wireless communication performance of the sensor network includes comparing a first performance of the sensor network associated with a deployment period with a second performance of the sensor network associated with a maintenance period; and changing the sensor network configuration for one or more zones of the plurality of zones includes updating an analysis processor that determines the wireless communication performance of the sensor network.

19. The method as described in claim 11, further comprising generating a sensor fingerprint for each sensor of the plurality of sensors based on at least one of the aggregate fingerprint or the zone fingerprint.

20. The method as described in claim 19, further comprising determining whether a receiving characteristic of at least one sensor of the plurality of sensors has changed based on the plurality of sensor fingerprints, wherein changing the sensor network configuration for the one or more zones of the plurality of zones includes changing the sensor network configuration for the one or more zones of the plurality of zones in response to determining that the distance between a particular pair of sensors does not meet a distance threshold.

* * * * *